United States Patent [19]

Washbourn et al.

[11] 3,716,215
[45] Feb. 13, 1973

[54] VALVE ASSEMBLY

[75] Inventors: Jack Washbourn, Malmesburg; Philip Norman Paginton, Chippenham, both of England

[73] Assignee: Westinghouse Brake & Signal Company, Ltd., London, England

[22] Filed: March 24, 1971

[21] Appl. No.: 127,449

[30] Foreign Application Priority Data

April 17, 1970 Great Britain.....................18,455/70

[52] U.S. Cl..................................................251/358
[51] Int. Cl............................................F16k 51/00
[58] Field of Search..............251/358, 359, 356, 317

[56] References Cited

UNITED STATES PATENTS

| | | | |
|---|---|---|---|
| 2,908,293 | 10/1959 | Johnson | 251/317 X |
| 3,093,153 | 6/1963 | Horowitz | 251/358 X |
| 3,152,608 | 10/1964 | Morrison et al. | 251/358 X |
| 3,610,575 | 10/1971 | Yoneda | 251/315 |
| 2,994,505 | 8/1961 | Brakebill | 251/358 |
| 3,092,365 | 6/1963 | Knappe | 251/358 X |
| 3,310,277 | 3/1967 | Nielsen et al. | 251/358 X |
| 3,316,929 | 5/1967 | Milette | 251/358 X |
| 3,363,645 | 1/1968 | Miller | 251/358 X |
| 3,572,376 | 3/1971 | Pfeifer et al. | 251/358 X |

Primary Examiner—Samuel Scott
Attorney—Ralph W. McIntire, Jr.

[57] ABSTRACT

A valve assembly characterized by a valve element including a rigid circular support member provided with a central opening and on which support member a shaped body of resilient material passing through the central opening and disposed on both sides of the support member is bonded, the peripheral portion of the support member being deformable to permit clamping or securing of the valve element to a valve carrier member.

3 Claims, 7 Drawing Figures

PATENTED FEB 13 1973

3,716,215

INVENTOR.
JACK WASHBOURN
PHILIP NORMAN PAGINTON
BY Ralph W. McIntire, Jr.
ATTORNEY

VALVE ASSEMBLY

BACKGROUND OF INVENTION

In the construction of valve elements of the type in which a resilient material or elastomer such as rubber, for example, acts as the sealing element and is bonded to a rigid backing or support element, which may be metal, it is sometimes difficult to obtain an effective long-lasting bond between the two materials. Many times, therefore, the sealing material prematurely separates from the support material.

SUMMARY OF INVENTION

The object of the present invention is to provide a valve structure and assembly that protects against separation of an elastomer sealing material from the rigid support member to which it is bonded to thereby provide a more reliable and durable valve structure.

The valve assembly embodying the invention comprises a circular rigid support member having a central opening through which the elastomer forming the sealing portion of the valve member may pass so that the sealing element thus comprises an integral body disposed and bonded on both sides of the rigid support member. The peripheral portion of the support member, which may be a metal material, is deformable to provide for securement of the valve assembly to a carrier member by crimping or pressing said peripheral portion over and around an annular shoulder formed on the valve carrier.

Figure 1:
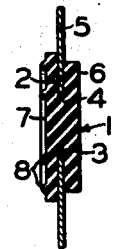
FIG. 1 shows, in section, the basic structure of a valve member embodying the invention.
Figure 2:
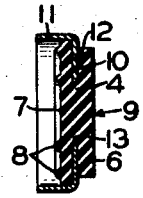
FIG. 2 shows, in section, a modified form of the valve member shown in FIG. 1.
Figure 4:
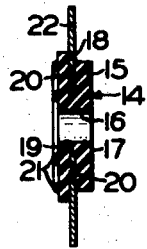
Figure 5:
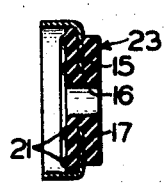
Figure 6:
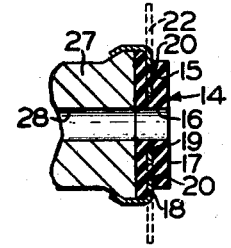
Figure 7:
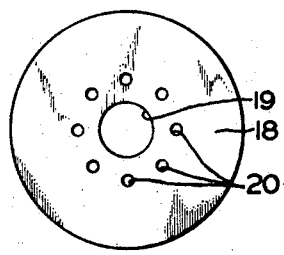

FIGS. 4 and 5 shown, in section, still further modified forms of the valve members shown in FIGS. 1 and 2, respectively;

FIG. 6 shows, mostly in section, the valve members shown in either FIGS. 4 and 5 mounted on a valve carrier; and FIG. 7 is a view, in outline, of a component of the valve members shown in FIGS. 4 through 6.

DESCRIPTION AND OPERATION

Referring to FIG. 1, a valve member 1 shown therein comprises a flat circular or washer-like support element 2 made of a rigid deformable material such as maleable metal, for example, and provided with a central opening 3. The valve member 1 further comprises a sealing or valve-seating element 4 comprising an elastomer or resilient material such as rubber, for example, which passes through the central opening 3 of the support element to form an integral body of two circular portions disposed on and bonded respectively to both sides of the support element.

The respective diametral dimensions of the two circular portions forming the sealing element 4 on opposite sides of the support element 2 are greater than the opening 3 but less than the diametral dimension of the support element to thereby provide a peripheral portion 5 of said support element extending radially beyond the peripheral limits of the valve-seating element 4 for a purpose to be hereinafter disclosed. The sealing or valve-seating element 4 has oppositely disposed faces 6 and 7 of which face 6, when the valve member 1 is in use, is sealingly engageable or in seating relation with a cooperating valve member (not shown). The other face 7 has formed thereon a pair of coaxial, radially spaced-apart, annular sealing beads 8 for a purpose to be hereinafter disclosed.

As shown in FIG. 2, a valve member 9 differs from the valve member 1 shown in FIG. 1 only in that said valve member 9 is provided with a support member 10 having a peripheral portion 11 (for a purpose to be hereinafter disclosed) in the form of a skirt peripherally surrounding and in perpendicular relation to a central portion 12 of said support member adjacent the side 7 of the sealing or valve-seating element 4. The support member 10 is also provided with a central opening 13 for a purpose similar to that set forth in connection with the opening 3 in the support member 2 of the valve member 1.

A further modified valve member 14 is shown in FIG. 4. The valve member 14 differs from the valve member 1 shown in FIG. 1 in that a sealing or valve-seating element 15 has a concentric opening or passageway 16 extending therethrough to permit passage of fluid when a sealing face 17 of the valve member is in an unseated relationship relative to a cooperating valve member (not shown). The sealing element 15 is bonded to a circular flat support element 18 in a manner similar to that in which sealing element 4 is bonded to the support element 2 in FIG. 1. In addition to a central opening 19, the support element 18, as best seen in FIG. 7, is also provided with a plurality of equiangularly spaced openings 20 arranged in annular fashion around said central opening and equiradially spaced therefrom. The resilient material forming the sealing or valve-seating element 15 also passes through each opening 20 to thereby provide additional direct and, therefore, stronger ties between the resilient material on opposite sides of the support element 18. The sealing element 15 is also provided with annular sealing beads 21. Similarly to support element 2 in FIG. 1, the support element 18 h as a radially projecting peripheral portion 22.

A valve member 23 shown in FIG. 5 differs from the value member 14 shown in FIG. 4 in similar manner as the valve member 9 shown in FIG. 2 differs from the valve member 1 shown in FIG. 1, and, consequently, needs no further description.

Figure 3:
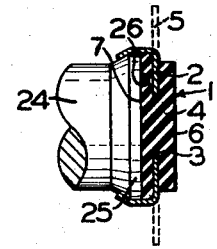
FIG. 3 shows, mostly in section, the valve members shown in either FIGS. 1 or 2 mounted on a valve carrier.

In FIG. 3, the valve member 1 of FIG. 1 is shown mounted on a valve carrier 24. The valve carrier 24 has formed thereon, at the end adjacent the valve member 1, an annular shoulder 25 on which the peripheral portion 5 of the support element 2 is deformed by pressing or crimping to secure the valve member thereon. The original shape of the peripheral portion 5 is shown in broken outline. It should be apparent that the valve member 9 shown in FIG. 2 may be mounted on the carrier 24 in similar manner as the valve member 1. With either the valve member 1 or the valve member 9 mounted on the valve carrier 24, the sealing beads 8 are substantially completely deformed so that face 7 of the sealing element 4 assumes a shape complementary to that of an adjacent face 26 of the carrier to form an air-tight seal therebetween.

FIG. 6 shows a valve assembly of either the valve member 14 or the valve member 15 mounted on a valve carrier 27 which differs from the valve carrier 24 only in that it is provided with a central bore or passageway 28 axially aligned with the opening 16 in the sealing element 15.

The valve assemblies shown in FIG. 3 and 6 may function either as a closure valve of which the faces 6 and 17 of the sealing elements 14 and 15, respectively, are engageable with a valve seat (Not shown), or, alternatively, said faces of the respective sealing elements may act as valve seats against which other valve closure elements (not shown) are engageable.

Having now described the invention what we claim as new and desire to secure by Letters Patent, is:

1. A valve assembly comprising:
   a. a circular support element having a central opening therein;
   b. a resilient valve-seating element passing through said central opening and having respective portions disposed on opposite sides of said circular support element; and
   c. valve-carrying means for operably carrying said support and valve-seating elements,
   d. said support member being characterized by an annular deformable portion formed peripherally and integrally with said support member for securing the support member to the valve-carrying means.

2. A valve assembly, as defined in claim 1, wherein said deformable peripheral portion of said support element comprises a skirt extending axially from and peripherally surrounding a concentric flat portion of the support element.

3. A valve assembly, as defined in claim 1, further characterized by an annular shoulder formed on one end of the valve-carrying means and on which said deformable peripheral portion is secured.

* * * * *